(12) United States Patent
Kathail et al.

(10) Patent No.: US 9,147,024 B1
(45) Date of Patent: Sep. 29, 2015

(54) HARDWARE AND SOFTWARE COSYNTHESIS PERFORMANCE ESTIMATION

(71) Applicant: Xilinx, Inc., San Jose, CA (US)

(72) Inventors: Vinod K. Kathail, Palo Alto, CA (US); Hua Sun, San Jose, CA (US); Sundararajarao Mohan, Sunnyvale, CA (US); L. James Hwang, Portola Valley, CA (US); Yogesh L. Chobe, Santa Clara, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/535,258

(22) Filed: Nov. 6, 2014

(51) Int. Cl.
*G06F 17/50* (2006.01)
(52) U.S. Cl.
CPC .................................. *G06F 17/505* (2013.01)
(58) Field of Classification Search
CPC ................................................... G06F 17/5045
USPC ......................................................... 716/104
See application file for complete search history.

(56) References Cited

U.S. PATENT DOCUMENTS

2001/0052739 A1* 12/2001 Milsom ......................... 310/366
2009/0121802 A1* 5/2009 Tsuzuki et al. .............. 333/17.1
2012/0293279 A1* 11/2012 Gong et al. ..................... 333/202

OTHER PUBLICATIONS

Henkel, J. et al., "High-Level Estimation Techniques for Usage in Hardware/Software Co-Design," In IEEE 1998 Design Automation Conf. Proc. of 2008 Asia and South Pacific Design Automation Conf., pp. 353-360, Feb. 1998.
Gerin, P. et al., "Flexible and Executable Hardware/Software Interface Modeling for Multiprocessor SoC Design Using SystemC," In IEEE 1997 Design Automation Conf. Proc. of 2007 Asia and South Pacific Design Automation Conference (ASP-DAC '07) IEEE, 390-395, 2007.

\* cited by examiner

*Primary Examiner* — Suresh Memula
(74) *Attorney, Agent, or Firm* — Kevin T. Cuenot

(57) ABSTRACT

Hardware and software co-synthesis performance estimation includes, for a design specified in a high level programming language and having a processor executable partition and a partition selected for hardware acceleration, estimating hardware latency for a hardware accelerator implementation of the selected partition, scheduling the selected partition using the hardware latency generating hardware partition latency information, and compiling an instrumented version of the design using a processor. The instrumented and compiled version of the design is executed generating software latency information. A design performance for the design is determined through combining the hardware partition latency information with the software latency information.

20 Claims, 8 Drawing Sheets

100

500

```
10:  int main(int argc, char** argv)
11:  {
12:    float *inBuf1, *inBuf2, *inBuf3, *interBuf, *outBuf;
13:    inBuf1 = (float*) malloc(SIZE);
         …
         …
92:    mmult_accel(inBuf1, inBuf2, interBuf);
93:    mmult_accel(interBuf, inBuf3, outBuf);
         …
         …
98:    return 0;
99:  }
```

HARDWARE AND SOFTWARE COSYNTHESIS PERFORMANCE ESTIMATION

FIELD OF THE INVENTION

This disclosure relates to integrated circuits (ICs) and, more particularly, to estimating the performance of a design partitioned for implementation using hardware and software.

BACKGROUND

A system-on-chip (SOC) is an integrated circuit (IC) that includes a plurality of different subsystems. The subsystems are included within a single chip substrate. The subsystems of the SOC are integrated to work cooperatively with one another. One example of an SOC is a chip level implementation of a computer or other data processing system. For example, the SOC may include a processor that executes program code such as an operating system and/or one or more applications. The processor operates cooperatively with one or more of the other on-chip subsystems. The other subsystems may be digital circuits, analog circuits, mixed-signal circuits, or the like. Exemplary subsystems that may be included within an SOC and operate cooperatively with a processor may include, but are not limited to, wireless transceivers, signal processors, CODECs, memory, memory controllers, I/O peripherals, and the like.

When designing an SOC, the designer must determine those portions of the design that will remain as executable program code and, as such, will be executed by a processor and those portions of the design that are to be implemented in hardware. Portions of the design selected for implementation in hardware are said to be "hardware accelerated." In this regard, a circuit or circuit block implementation of a portion of a design, e.g., a software function, may be called a "hardware accelerator."

One of the challenges in designing an SOC is determining which portions of the design should be hardware accelerated and which should not. In the case of a complex design, there are a significant number of alternative architectures where each architecture hardware accelerates different portions and/or different combinations of portions of the design. Testing each alternative architecture by actually implementing the design in hardware may take hours or even days of work for each hardware accelerated section. This makes evaluating different alternative architectures for a design infeasible.

SUMMARY

A method includes, for a design specified in a high level programming language and having a processor executable partition and a partition selected for hardware acceleration, estimating hardware latency for a hardware accelerator implementation of the selected partition. The method includes scheduling the selected partition using the hardware latency, generating hardware partition latency information, compiling an instrumented version of the design using a processor, and executing the instrumented and compiled version of the design, generating software latency information. The method also includes determining a design performance estimate for the design through combining the hardware partition latency information with the software latency information.

A system includes a processor, programmed to initiate executable operations. The executable operations include, for a design specified in a high level programming language and having a processor executable partition and a partition selected for hardware acceleration, estimating hardware latency for a hardware accelerator implementation of the selected partition. The executable operations also include scheduling the selected partition using the hardware latency, generating hardware partition latency information, compiling an instrumented version of the design, and executing the instrumented and compiled version of the design using a processor of a target integrated circuit generating software latency information. The executable operations further include determining a design performance estimate for the design through combining the hardware partition latency information with the software latency information.

A non-transitory computer-readable storage medium has instructions stored thereon which, when executed by a processor, perform a method. The method includes, for a design specified in a high level programming language and having a processor executable partition and a partition selected for hardware acceleration, estimating hardware latency for a hardware accelerator implementation of the selected partition and scheduling the selected partition using the hardware latency generating hardware partition latency information. The method includes compiling an instrumented version of the design using the processor, executing the instrumented and compiled version of the design generating software latency information, and determining a design performance estimate for the design through combining the hardware partition latency information with the software latency information.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

Figure 1:
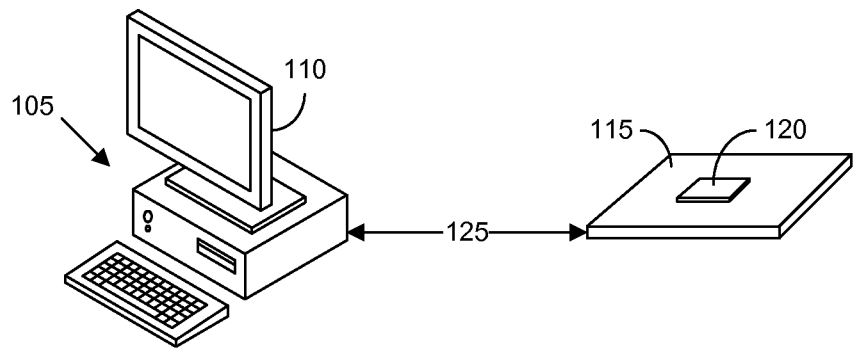
FIG. 1 is a block diagram illustrating an exemplary development environment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to estimating the performance of a design that is partitioned for implementation using hardware and software. In accordance with the inventive arrangements disclosed herein, the performance of a design may be estimated and/or determined without fully implementing the design within a target IC. Particular sections of the design selected for hardware acceleration may be characterized without implementing those sections in hardware. Sections of the design that are to remain as executable program code and execute within a processor of the target IC may be instrumented with diagnostic program code, compiled, and executed. Software latency information derived from execution of the instrumented and compiled design may be combined with the characterization of the hardware accelerated sections of the design. The combined result provides an accurate estimation of the performance of the design for the specified partitioning into executable partitions and hardware accelerated partitions.

The inventive arrangements described herein may be implemented as a method or process performed by a data processing system. In another aspect, the inventive arrangements may be implemented as a data processing system having a processor and a display device. The processor, upon executing program code, evaluates a partitioned design and estimates performance of the design. In another aspect, the inventive arrangements may be implemented as a development system including a data processing system, a development platform, and an IC coupled to the development platform. In yet another aspect, the inventive arrangements may be implemented as a non-transitory computer-readable storage medium storing program code that, when executed, causes a processor and/or a system to perform and/or initiate a method or process.

Several definitions that apply throughout this document now will be presented. As defined herein, the term "high level programming language" means a programming language, or set of instructions, used to program a data processing system where the instructions have a strong abstraction from the details of the data processing system, e.g., machine language. The programming language may also be used to specify or describe a digital system. A high level programming language may automate or hide aspects of operation of the data processing system such as memory management. The amount of abstraction typically defines how "high level" the programming language is. When using a high level programming language, the user need not contend with registers, memory addresses, etc. of the data processing system upon which the high level programming language may execute. In this regard, a high level programming language, for example, may include few or no instructions that translate directly, on a one-to-one basis, into a native opcode of a data processing system. Examples of high level programming languages include, but are not limited to, C, C++, SystemC, or the like.

As defined herein, the term "hardware description language" is a computer-language that facilitates the documentation, design, and implementation of a digital system. The implementation of the digital system may include the transformation of the digital system into a set of masks for IC manufacturing, the programming of a programmable IC such as a field programmable gate array (FPGA), or the like. Using an HDL, for example, a user can design and specify an electronic circuit, describe the operation of the circuit, and create tests to verify operation of the circuit. An HDL includes standard, text-based expressions of the spatial and temporal structure and behavior of the digital system being modeled. HDL syntax and semantics include explicit notations for expressing concurrent operations in a digital system and synchronizing the progress of concurrent operations to achieve a particular combined behavior. In many circuits, this synchronization is based on a globally visible signal called a "clock." It should be appreciated, however, that other mechanisms for synchronization between portions of a circuit may be provided. Thus, in contrast to most high level programming languages, an HDL includes an explicit notion of time, which is a primary attribute of a digital system. An HDL is not equivalent to a high level programming language.

As defined herein, "register-transfer level" (RTL) means a human readable language such as source code that provides a design abstraction for digital circuit design. RTL is used to specify a digital circuit in terms of the flow of digital signals (data) between hardware registers and the logical operations performed on those signals. HDLs such as VHDL and/or Verilog utilize RTL constructs to create high-level representations of a circuit, from which lower-level representations and ultimately actual wiring may be derived.

As defined herein, a "partition" means a section, function, or portion of a design specified in high level programming language. Each partition is designated for hardware acceleration, i.e., implementation in circuitry, within the target IC or execution as program code within a processor of a target IC. Thus, a partitioned design is one where the particular sections of the design that are to be implemented in hardware or circuitry as one or more hardware accelerators are specified by the user.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary development environment 100. As pictured, development environment 100 includes a data processing system (system) 105 having a display device 110. System 105, for example, may be implemented as a computer system or the like. System 105 is coupled to a development platform 115 through a communication link 125.

Development platform 115 may be implemented as a circuit board such as a printed circuit board having circuitry implemented thereon. Development platform 115 may include a connector that couples to communication link 125. The connector may be coupled, using circuitry of development platform 115, to an IC 120. IC 120 may be coupled to development platform 115 using a socket, a receptacle, another mounting technique such as soldering IC 120 directly to development platform 115, or the like. In any case, IC 120 couples to communication link 125 through development platform 115.

In one aspect, IC 120 is a programmable IC. In another aspect, IC 120 is a system-on-chip (SOC). A programmable IC also may be implemented as an SOC. For example, an IC may include a processor configured to execute program code in addition to one or more subsystems implemented using programmable circuitry of the IC.

As noted, system 105 is coupled to development platform 115 through communication link 125. Communication link 125 may be implemented as any of a variety of different wired and/or wireless connections. Exemplary wired implementations of communication link 125 include, but are not limited to, point-to-point Ethernet, Universal Serial Interconnect (USB), FireWire (IEEE 1394 interface), or the like. Exemplary wireless implementations of communication link 125 include, but are not limited to, Bluetooth®, Wi-Fi®, or the like. In the case of a wireless implementation of communication link 125, the connector of development platform 115 may be implemented as a wireless transceiver. The exemplary communication links noted within this disclosure are provided for purposes of illustration only and are not intended as limitations.

In operation, a user working through system 105 may create a design specified in a high level programming language. The user further may partition the design. System 105 operates upon the design and determines an estimate of the performance of the design given the specified partitioning. In one aspect, those partitions of the design designated for execution by a processor of an SOC may be evaluated through execution of the partitions in a processor of IC 120. In another aspect, those partitions of the design designated for execution by a processor of the SOC may be evaluated through execution of the partitions in a processor of system 105, e.g., using emulation and/or virtualization software to emulate operation of the type of processor found in the SOC if different from the processor included in system 105.

Figure 2:
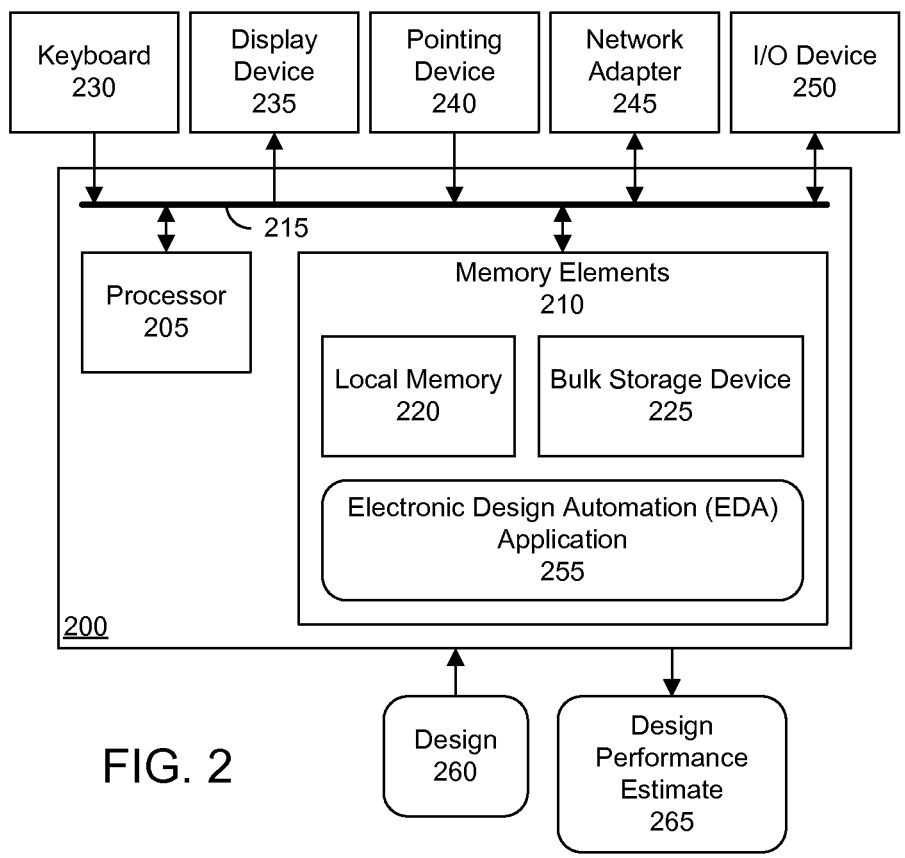
FIG. 2 is a block diagram illustrating an exemplary data processing system.

FIG. 2 is a block diagram illustrating an exemplary data processing system. FIG. 2 illustrates an exemplary implementation of system 105 of FIG. 1. System 105 includes at least one processor, e.g., a central processing unit (CPU), 205 coupled to memory elements 210 through a system bus 215 or other suitable circuitry. System 105 stores program code within memory elements 210. Processor 205 executes the program code accessed from memory elements 210 via system bus 215. In one aspect, system 105 is implemented as a computer or other data processing system that is suitable for storing and/or executing program code. It should be appreciated, however, that system 105 may be implemented in the form of any system including a processor and memory that is capable of performing the functions described within this disclosure.

Memory elements 210 include one or more physical memory devices such as, for example, a local memory 220 and one or more bulk storage devices 225. Local memory 220 refers to random access memory (RAM) or other non-persistent memory device(s) generally used during actual execution of the program code. Bulk storage device 225 may be implemented as a hard disk drive (HDD), solid state drive (SSD), or other persistent data storage device. System 105 may also include one or more cache memories (not shown) that provide temporary storage of at least some program code in order to reduce the number of times program code must be retrieved from bulk storage device 225 during execution.

Input/output (I/O) devices such as a keyboard 230, a display device 235, and a pointing device 240 may optionally be coupled to system 105. The I/O devices may be coupled to system 105 either directly or through intervening I/O controllers. A network adapter 245 may also be coupled to system 105 to enable system 105 to become coupled to other systems, computer systems, remote printers, remote storage devices through intervening private or public networks, and/or development platform 115 of FIG. 1. Modems, cable modems, Ethernet cards, and wireless transceivers are examples of different types of network adapter 245 that may be used with system 105. An input/output (I/O) device 250 such as a USB port, a FireWire port, or the like also may be coupled to system 105 to allow system 105 to become coupled to another system such as any of the aforementioned systems including development platform 115 of FIG. 1.

As pictured in FIG. 2, memory elements 210 store an electronic design automation (EDA) application 255. EDA application 255, being implemented in the form of executable program code, is executed by system 105. As such, EDA application 255 is considered an integrated part of system 105. While illustrated as a single application, in another aspect, EDA application 255 may be implemented by one or more application programs that execute cooperatively with one another.

System 105, while executing EDA application 255, receives and operates upon a design 260. Design 260 is partitioned. The partitioning may be specified within design 260 or within one or more other files associated with design 260. Design 260 may be specified in a high level programming language as one or more source code files. System 105 operates upon design 260 and generates design performance estimate for design 265, given the specified partitioning of design 260. In this regard, design performance estimate 265 accounts for hardware and software co-synthesis and is partitioning-specific for design 260.

Figure 3:
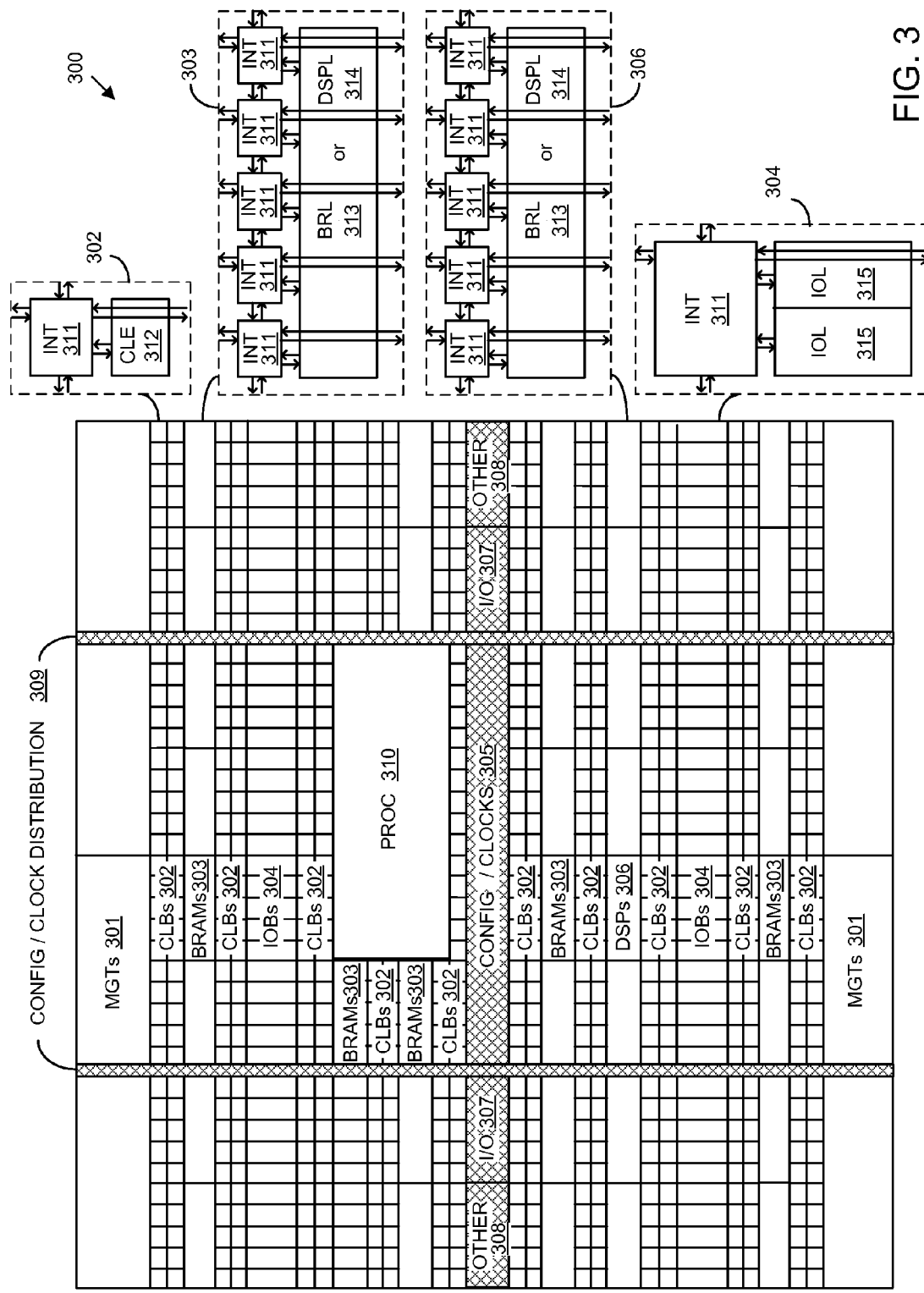
FIG. 3 is a block diagram illustrating an exemplary architecture for an integrated circuit (IC).

FIG. 3 is a block diagram illustrating an exemplary architecture 300 for an IC. For example, architecture 300 may be used to implement IC 120 of FIG. 1. In one aspect, architecture 300 is implemented within a field programmable gate array (FPGA) type of IC. Architecture 300 is also representative of an SOC type of IC.

As shown, architecture 300 includes several different types of programmable circuit, e.g., logic, blocks. For example, architecture 300 may include a large number of different programmable tiles including multi-gigabit transceivers (MGTs) 301, configurable logic blocks (CLBs) 302, random access memory blocks (BRAMs) 303, input/output blocks (IOBs) 304, configuration and clocking logic (CONFIG/CLOCKS) 305, digital signal processing blocks (DSPs) 306, specialized I/O blocks 307 (e.g., configuration ports and clock ports), and other programmable logic 308 such as digital clock managers, analog-to-digital converters, system monitoring logic, and so forth.

In some ICs, each programmable tile includes a programmable interconnect element (INT) 311 having standardized connections to and from a corresponding INT 311 in each adjacent tile. Therefore, INTs 311, taken together, implement the programmable interconnect structure for the illustrated IC. Each INT 311 also includes the connections to and from the programmable logic element within the same tile, as shown by the examples included at the top of FIG. 3.

For example, a CLB 302 may include a configurable logic element (CLE) 312 that may be programmed to implement user logic plus a single INT 311. A BRAM 303 may include a BRAM logic element (BRL) 313 in addition to one or more INTs 311. Typically, the number of INTs 311 included in a tile depends on the height of the tile. As pictured, a BRAM tile has the same height as five CLBs, but other numbers (e.g., four) also may be used. A DSP tile 306 may include a DSP logic element (DSPL) 314 in addition to an appropriate number of INTs 311. An IOB 304 may include, for example, two instances of an I/O logic element (IOL) 315 in addition to one instance of an INT 311. As will be clear to those of skill in the art, the actual I/O pads connected, for example, to IOL 315 typically are not confined to the area of IOL 315.

In the example pictured in FIG. 3, a columnar area near the center of the die, e.g., formed of regions 305, 307, and 308, may be used for configuration, clock, and other control logic. Horizontal areas 309 extending from this column are used to distribute the clocks and configuration signals across the breadth of the programmable IC.

Some ICs utilizing the architecture illustrated in FIG. 3 include additional logic blocks that disrupt the regular columnar structure making up a large part of the IC. The additional logic blocks may be programmable blocks and/or dedicated circuitry. For example, a processor block depicted as PROC 310 spans several columns of CLBs and BRAMs.

In one aspect, PROC 310 is implemented as dedicated circuitry, e.g., as a hardwired processor, that is fabricated as part of the die that implements the programmable circuitry of the IC. PROC 310 represents any of a variety of different processor types and/or systems ranging in complexity from an individual processor, e.g., a single core capable of executing program code, to an entire processor system having one or more cores, modules, co-processors, interfaces, or the like.

In another aspect, PROC 310 is omitted from architecture 300 and replaced with one or more of the other varieties of the programmable blocks described. Further, such blocks may be utilized to form a "soft processor" in that the various blocks of programmable circuitry may be used to form a processor that executes program code as is the case with PROC 310.

The phrase "programmable circuitry" means programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 3 that are external to PROC 310 such as CLBs 302 and BRAMs 303 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks that is otherwise non-existent.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry has dedicated circuit blocks and interconnects, for example, that are functional without first loading a configuration bitstream into the IC. An example of hardwired circuitry is PROC 310.

In some instances, hardwired circuitry may have one or more operational modes that may be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 310 or a soft processor. In some cases, architecture 300 includes a dedicated configuration processor that loads the configuration bitstream to the appropriate configuration memory and/or processor memory. In other cases, architecture 300 may utilize PROC 310 to receive the configuration bitstream, load the configuration bitstream into appropriate configuration memory, and/or extract program code for execution.

FIG. 3 is intended to illustrate an exemplary architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 3 are purely exemplary. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 310 within the IC are for purposes of illustration only and are not intended as limitations.

Figure 4:
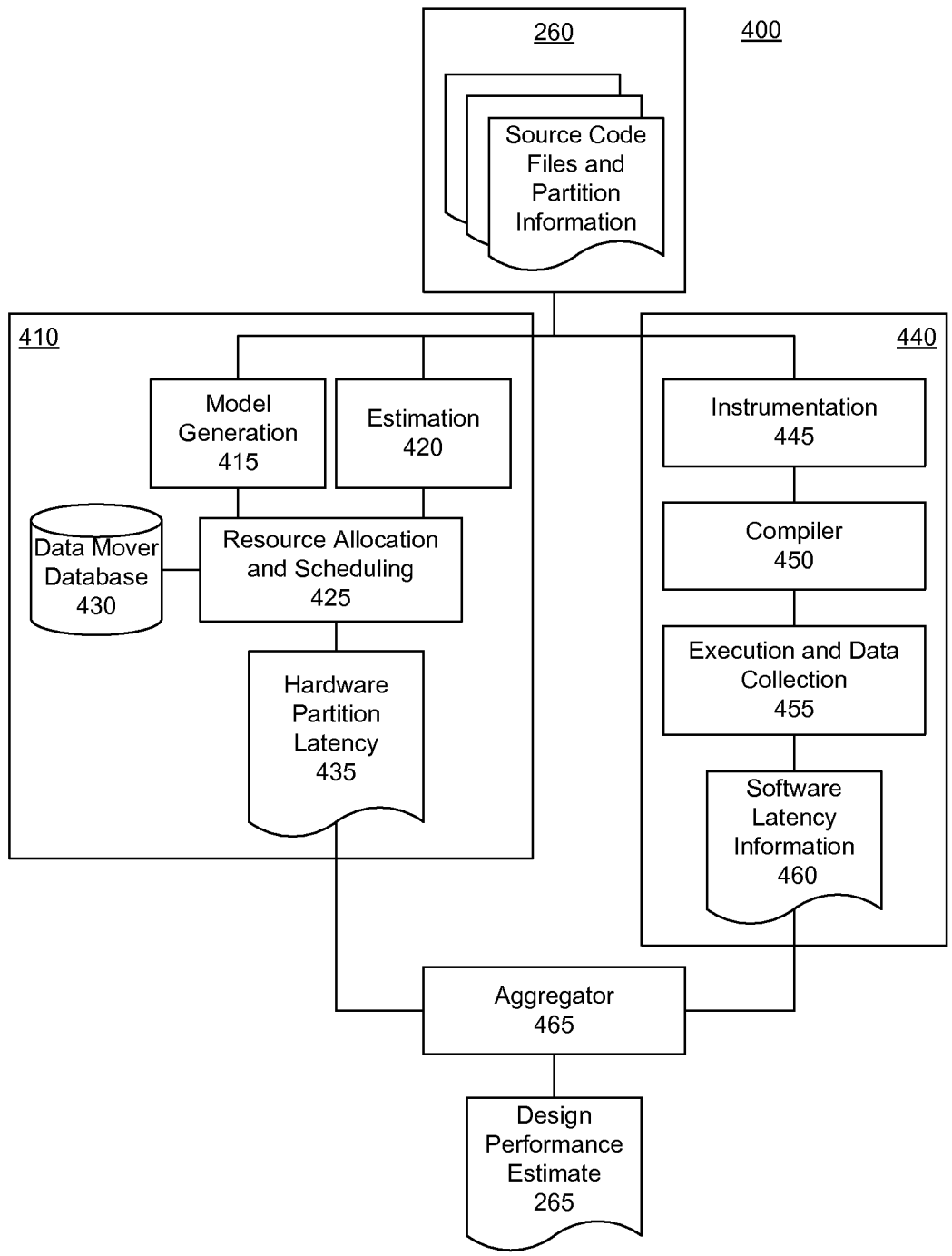
FIG. 4 is a block flow diagram illustrating an example of hardware and software co-synthesis performance estimation for a design.

FIG. 4 is a block flow diagram 400 illustrating an example of hardware and software co-synthesis performance estimation for a design. Block flow diagram 400 represents the various operations performed by a system such as system 105 in estimating performance of a design having a specified partitioning.

Design 260 is received as input to the system. The system performs hardware and software co-synthesis performance estimation upon design 260. Design 260 includes one or more source code files specifying the design in a high level programming language. Design 260 further includes partitioning information. The partitioning information specifies which portions of the design, e.g., "partitions," are to be implemented in hardware and which partitions are to be implemented as executable program code and executed by the processor of the target IC. The partitioning information further specifies the particular hardware platform that will be used to execute the executable partitions of the design. For example, partitioning information may specify a type or model of target IC that is to be used.

In general, block flow diagram 400 includes two different processing paths. One path represented by block 410 includes hardware performance estimation operations. Block 410 illustrates the operations performed to estimate performance of the partitions of design 260 that are to be implemented in hardware, e.g., circuitry, of the target IC. The other path represented by block 440 includes software performance operations. Block 440 illustrates operations performed to estimate performance of design 260 when implemented only as executable program code and executed by a processor without hardware acceleration.

The various blocks included in blocks 410 and 440 represent functions, modules, or the like of EDA application 255 that operate upon design 260. As previously discussed, while FIG. 4 is described as an implementation of EDA application 255, in another aspect EDA application 255 may be formed of one or more programs that interact cooperatively with one another. For example, one or more of the various blocks illustrated in FIG. 4 may be implemented as standalone programs that execute cooperatively with one another but are collectively referred to as EDA application 255. Further, such programs may be implemented in more than one data processing system where the data processing systems are networked together. Thus, in one aspect, system 105 may be implemented as two or more data processing systems networked together.

Referring to block 410, model generation block 415 generates a scheduling model of the partitions that are to be implemented in hardware, i.e., hardware accelerated. In one aspect, the scheduling model may be implemented as a directed graph where nodes represent program code, data transfers between processor and hardware accelerator, and/or data transfers between hardware accelerators. Edges linking the nodes represent data flows. Each edge represents a dependency, e.g., a data dependency, between the nodes connected by the edge.

In one aspect, estimation block 420 performs an estimation of the latency of the partitions designated for hardware acceleration of design 260 as implemented in circuitry. Estimation block 420 calculates an estimate of hardware accelerator latency. Hardware accelerator latency is the time required for the hardware accelerator to process a received data input and generate a data output. It should be appreciated that estimation module 420 does not generate a description of actual circuit components, e.g., a circuit design, for the partitions that are to be hardware accelerated. Rather, estimation block 420 estimates, based upon the provided partition specified using a high level programming language, the latency of each partition designated for hardware acceleration as implemented in circuitry.

In another aspect, estimation block 420 performs an estimation of the hardware resources of the IC needed to implement each partition of design 260 designated for hardware acceleration. Estimation block 420 may estimate a type and a number of each type of resource needed to implement each of the partitions designated for hardware acceleration. For example, estimation block 420 may estimate the number of DSP tiles, BRAMs, CLBs, and the like needed to implement each partition designated for hardware acceleration. Further, estimation block 420 may estimate the type and number of each type of resource of the IC needed for implementing all of the partitions designated for hardware acceleration of design 260.

In one aspect, estimation block 420 performs the estimation, whether for latency and/or for resource usage, by first translating the partitions designated for hardware acceleration from the high level programming language into RTL representations. The RTL representations may be cycle accurate representations of the partitions. Using the RTL representations, estimation block 420 calculates an estimate of the hardware accelerator latency and the resource usage for the designated partitions. For example, estimation block 420 may determine, for each function provided thereto, an estimate of latency, resource usage, hardware interface protocol, and the like.

Resource allocation and scheduling (RAS) block 425 receives the scheduling model of the hardware accelerated partitions from model generation block 415 and the hardware accelerator latency and/or resource usage estimated by estimation block 420. RAS block 425 may annotate the scheduling model with the hardware accelerator latency and/or the resource usage estimate.

In another aspect, RAS block 425 may determine the particular type of data mover circuit blocks (data movers) and number of such data movers that will be used to transfer data between the processor and the hardware accelerators within the target IC. Examples of different types of data movers include direct memory access (DMA) circuit blocks, direct connections, a first-in-first-out (FIFO) memory, or the like. Each different type of data mover requires a particular driver that is executed by the processor of the target IC in order for the processor to interact with the data mover.

For example, if a DMA circuit block is selected as the type of data mover to perform a data transfer, RAS block 425 determines that two types of hardware resources are required. In particular, a processor core and a DMA circuit block are allocated for the partition. The processor core is required to execute a driver for the DMA circuit block. The DMA circuit block itself is required to transfer the data.

The selection of one type of data mover over another depends upon a variety of factors. The factors evaluated by RAS block 425 may include, but are not limited to, memory attributes such as whether a memory is physically contiguous or non-contiguous, cacheable or non-cacheable, the amount of data to be transferred, port interface type, data dependencies, etc.

Data mover database 430 stores a profile for each type of data mover. It should be appreciated that while data mover database 430 is described as a database, the data stored within data mover database 430 may be stored in any of a variety of different formats. For example, the data may be stored in text files in eXtensible markup language (XML) documents, delimited files, or the like.

The profiles specify data mover circuit block latency. The profiles further may specify hardware resource usage for each data mover. Data mover database 430, for example, may store a profile for a DMA type data mover and a profile for a FIFO type of data mover. The profile of a FIFO type of data mover may be characterized as having a memory mapped interface to the processor that is slower than the interface of a DMA type of data mover to the processor. Further, the profile for a DMA type of data mover indicates that a streaming interface is provided to the hardware accelerator, which is also considered a faster interface than is available for connecting a FIFO type of data mover to the hardware accelerator.

Profiles for the different types of data movers may be associated with, or specify, a particular driver within data mover database 430. The profile for a given data mover, in addition to specifying a particular driver, may further specify driver setup time, data transfer synchronization time, and actual data transfer time. Driver setup time, as used herein, is also referred to as "driver execution time." As defined herein, the term "driver execution time" means the number of processor and/or CPU cycles needed for a driver of a data mover to inform the data mover that the data mover may start transferring the data or payload. As defined herein, the term "data transfer time" means the latency for the data mover to transfer the data or payload. As defined herein, the term "data transfer synchronization time" means the number of processor and/or CPU cycles needed to ensure that the expected amount of data or payload has been sent and/or received by the data mover.

In one aspect, given various factors such as data size to be moved (e.g., amount of data), memory attributes, data mover type, bus interface type, etc., RAS block 425 determines quantities such as driver setup time, data transfer synchronization time, and actual data transfer time from data mover database 430. Exemplary bus interface types may include, but are not limited to, an accelerator coherency port (ACP), an AXI FIFO Interface, or the like. In general, AXI is a high performance, high frequency interface suitable for submicron interconnects. A variety of AXI interfaces are described in the AMBA AXI Protocol specification published by ARM Ltd. of Cambridge, UK. Using quantities such as data size to be moved, memory attributes, data mover type, bus interface type, and the like, RAS 425 may index into data mover database 430 and locate values for quantities such as driver setup time (e.g., driver execution time), data transfer time, and data transfer synchronization time.

Based upon the profile of each available data mover and an analysis of the data transfer graph, RAS block 425 may select an appropriate type of data mover to be allocated for each data transfer required for hardware acceleration. For example, based upon the above analysis of the data transfers, RAS 425 determines an amount of data that is to be moved and an amount of time in which the data is to be moved. The system may compare the data transfer parameters and/or the dependency parameters relating to the data transfer with the profiles of the data movers to select an appropriate data mover for the data transfer. In this example, the data mover type is the one that can implement the data transfer in the amount of time specified.

Another consideration is that the target IC may provide more of one type of data mover than another. For example, the target IC may include more FIFO data movers than DMA data movers. Thus, if a given data transfer can be implemented using both a FIFO data mover and a DMA data mover, the system may select the FIFO data mover, e.g., the more plentiful type of resource.

In another illustration, some data mover types require a higher level of processor involvement than other types of data movers for operation. A FIFO data mover, for example, requires a higher level of processor involvement and coordination to operate than does a DMA data mover. A DMA data mover, in effect, offloads the data transfer from the processor to other specialized circuitry (i.e., hardware). Accordingly, the system can evaluate the level of processor activity that is occurring when a data transfer is to be made so as not to overload the processor.

As an example, if the workload of the processor would be pushed above a selected threshold by using a FIFO data mover to effectuate a data transfer, the system may instead choose a DMA data mover to effectuate the data transfer in order to keep the workload of the processor at an acceptable level, e.g., below the selected threshold. In this case, selecting the DMA data mover frees the processor to perform other activities. This example presumes that both types of data movers meet the speed requirements for the data transfer.

Another consideration when selected particular data mover circuit blocks relates to the role of the data mover circuit block within the target IC. In illustration, the physical interface between the processor and the programmable circuitry of an IC is well defined. One example of such an interface can be one or more AXI interfaces. Depending upon the interface, some data movers may operate as slaves on the processor side of the interface while other data movers operate as masters. A FIFO data mover, for example, operates as a slave on the processor side of an AXI interface, whereas a DMA data mover operates as a master on the processor side of the AXI interface within some target ICs.

RAS block 425 also schedules the design. The scheduling process assigns operations to points in time. RAS block 425 schedules design 260 according to which data transfers may be performed in parallel and which may not be performed in parallel based upon the scheduling model. In one aspect, RAS block 425 schedules design 260 using dependencies, e.g., data dependencies, specified in the latency model of each hardware resource, including hardware accelerator latency determined in estimation block 420 and driver execution latency. Using the scheduled design, RAS block 425 generates hardware partition latency 435. Hardware partition latency 435 is the time required to invoke a hardware accelerator, or hardware accelerators, from the processor. Hardware partition latency 435 includes, or depends upon, driver execution time (i.e., driver latency) in the processor, data mover latency, which may be specified to include driver execution time, and hardware accelerator latency. Hardware partition latency 435 further may include time for the processor to receive data generated as output from the hardware accelerator, which is also a data mover latency that may include a driver latency.

Referring to block 440, design 260 is instrumented by instrumentation block 445. In one aspect, design 260 is instrumented by inserting diagnostic program code specified in the high level programming language within the source code of design 260. The diagnostic program code may be inserted in the portion of design 260 that calls the partition(s) that is to be hardware accelerated. The diagnostic program code further may be inserted in the portion of design 260 to which the partition that is to be hardware accelerated returns. For example, one or more instructions may be included within the source code files of design 260 to report the processor program counter value immediately prior to calling and/or invoking the partition to be hardware accelerated. One or more instructions also may be included within the source code files of design 260 to report the processor program counter value immediately upon returning from execution of the partition to be hardware accelerated. Other diagnostic program code may be inserted to determine the program counter value at the start of execution of the design and at other points of interest within the design, e.g., at the beginning and end of partitions that are not to be hardware accelerated. It should be appreciated that the reporting instructions inserted within design 260 further may provide identifying information indicating a location within design 260 that is executed so that program counter values may be correlated with the particular partitions that are being executed and hardware accelerated.

In instrumenting design 260, the partitions to be hardware accelerated are left intact. Inclusion of the diagnostic program code through instrumentation of design 260 provides an indication of how long execution of the partition to be hardware accelerated actually requires using the processor. Accordingly, compiler 450 compiles the instrumented source code files. Execution and data collection block 455 execute the instrumented and compiled design 260 using a processor. In one aspect, the instrumented and compiled design 260 is provided to the processor within the target IC and executed therein. In another aspect, the instrumented and compiled design is executed within the system using an emulator or other virtual machine intended to emulate operation of the processor located within the target IC.

Execution and data collection block 455 receives program counter values as the diagnostic instructions are executed through execution of the instrumented and compiled version of design 260. In this regard, the system may determine the amount of time required for each partition that is to be hardware accelerated to execute as processor executable program code within the processor of the target IC. Similarly, the amount of time for partitions that are not hardware accelerated to execute in the processor may be determined. Execution and data collection block 455 generates software latency information 460 specifying the execution time of the various partitions to be hardware accelerated and/or partitions that are not to be hardware accelerated.

Aggregator block 465 combines hardware partition latency 435 and software latency information 460. The combined result is output as design performance estimate 265. Design performance estimate 265 specifies latency for design 260 with the specified partitioning. In other words, design performance estimate 265 provides an estimate of latency and resource usage were hardware and software co-synthesis performed on design 260 for the given partitioning.

In one aspect, design performance estimate 265 combines the execution time for partitions that are not hardware accelerated from software latency information 460 with hardware partition latency 435 to determine the overall latency for design 260. In another aspect, design performance estimate 265 indicates an improvement in overall design performance that is achieved through hardware accelerating the enumerated partitions compared to executing the partitions as executable program code using the processor of the target IC.

Figures 5, 6:
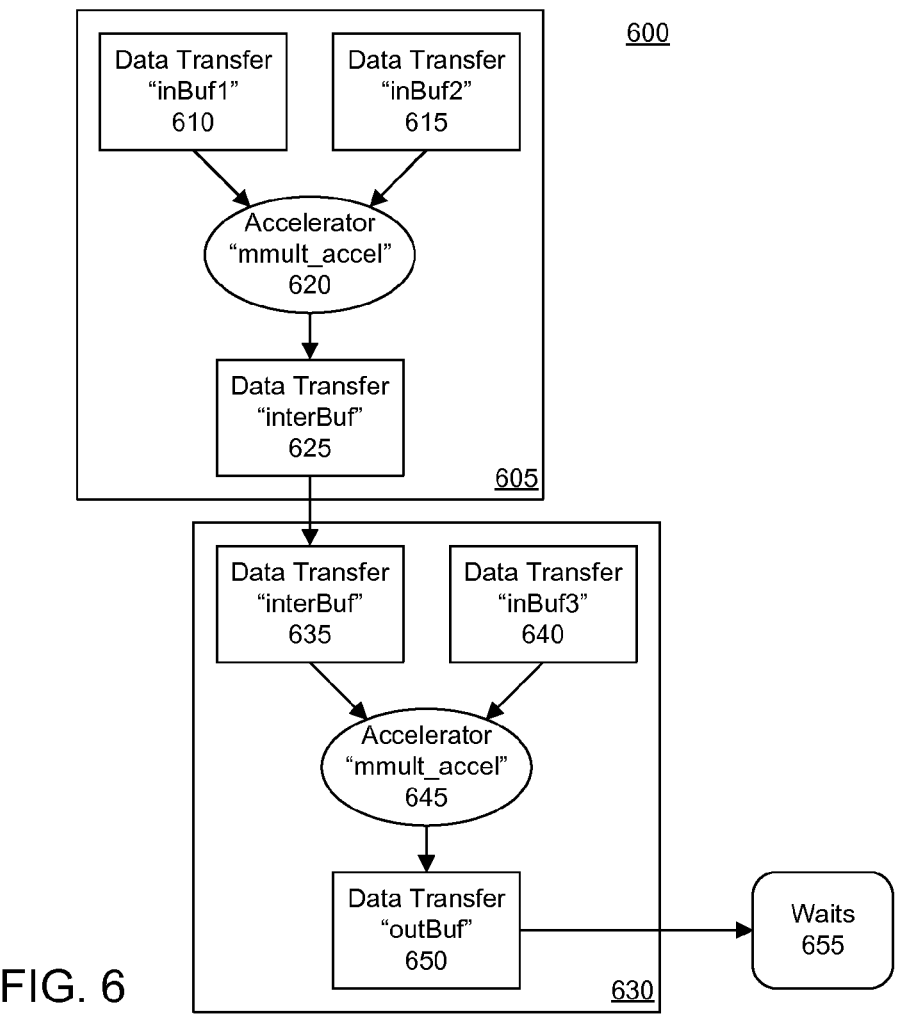
FIG. 5 illustrates a portion of an exemplary design that is to be hardware accelerated.
FIG. 6 is a block diagram illustrating an exemplary scheduling model of the portion of the design of FIG. 5.

FIG. 5 illustrates a portion of an exemplary design 500 that is to be hardware accelerated. Design 500 is specified in a high level programming language. A function named "mmult_accel" is invoked a first time at line 92 and invoked a second time at line 93. In the example of FIG. 5, the function "mmult_accel" is designated for hardware acceleration.

FIG. 6 is a block diagram illustrating an exemplary scheduling model 600 of the portion of design 500 of FIG. 5. Model 600 is an example of a scheduling model generated by model generation block 415 of FIG. 4 from design 500 of FIG. 5.

The system generates scheduling model 600 specifying two hardware accelerators represented as blocks 605 and 630. Block 605 represents a first hardware accelerator resulting from the first invocation of function "mmult_accel" at line 92 of FIG. 5. Block 630 represents a second hardware accelerator resulting from the second invocation of the function "mmult_accel" at line 93 of FIG. 5. Each of nodes 610, 615, 620, 625, 635, 640, 645, and 650 within blocks 605 and 630 represents program code, a data transfer between processor and hardware accelerator, a data transfer between hardware accelerators, or operation (e.g., execution) of the hardware accelerator.

Data transfers may be determined from the arguments of each invocation of the function "mmult_accel." The first invocation of the function "mmult_accel" at line 92 of FIG. 5 includes the arguments "inBuf1," "inBuf2," and "interBuf." Block 605 includes node 610 representing the data transfer "inBuf1" from the processor of the target IC into the hardware accelerator represented by block 605. Node 615 represents the data transfer "inBuf2" from the processor of the target IC into the hardware accelerator represented by block 605. Node 620, labelled "Accelerator 'multi_accel'" represents operation of the hardware accelerator implementing the function "multi_accel" from line 92 of FIG. 5. Node 625 represents the data transfer "interBuf" from the hardware accelerator represented by block 605 to the hardware accelerator represented by block 630.

The second invocation of the function "mmult_accel" at line 93 of FIG. 5 includes the arguments "interBuf," "inBuf3," and "outBuf." Block 630 includes node 635 representing the data transfer "interBuf" from the hardware accelerator represented by block 605 into the hardware accelerator represented by block 630. Node 640 represents the data transfer "inBuf3" from the processor of the target IC into the hardware accelerator represented by block 630. Node 645, labelled "Accelerator 'multi_accel'" represents operation of the hardware accelerator implementing the function "multi_accel" from line 93 of FIG. 5. Node 650 represents the data transfer "outBuf" from the hardware accelerator represented by block 630 to the processor of the target IC.

Node 655 is labelled "Waits." Node 655 represents the execution of a program code instruction within the processor. The program code instruction causes the processor to wait for previously discussed data transfers to synchronize the data between the hardware accelerator represented by node 630 and the processor memory. Node 655 represents the data transfer synchronization time.

Scheduling model 600 illustrates that a single hardware accelerator may require more than one data mover. For example, as each of blocks 605 and 630 includes two data transfers as inputs, the data transfers may be implemented using one data mover circuit block that performs the data transfers serially. In another aspect, the data transfers may be implemented using two or more data movers that perform the data transfers in parallel thereby requiring less time.

Referring to FIG. 6, each data transfer may be characterized using a plurality of parameters referred to herein as "data transfer parameters." Examples of data transfer parameters include size (e.g., as measured in bytes), a data transfer type (e.g., the beginning and end points of the data transfer), a data transfer condition defining the circumstances and/or context under which the data transfer occurs, a data transfer frequency, and a number of occurrences of the data transfer.

Data transfer type may indicate the direction of a data transfer. Data transfer type is assigned according to the source and destination of the data that is to be moved or transferred. Three exemplary data transfer types include (1) a data movement from processor to hardware accelerator, (2) a data transfer from hardware accelerator to processor, and (3) a data transfer from a first hardware accelerator to a second and different hardware accelerator.

The system, in generating scheduling model 600, determines the various dependencies that exist among the data transfers. Within FIG. 6, a "dependency" is represented by the various lines, or edges, linking the nodes. A dependency defines an order between two, or more, data transfers. For example, if data transfer "A" is dependent on data transfer "B," then data transfer A cannot start until data transfer B is finished. Referring to FIG. 6, data transfer 625 is dependent upon data transfers 610 and 615 as indicated by the directed lines. As such, data transfer 625 cannot start until data transfers 610 and 615 complete and the hardware accelerated implementation of "mmult_accel" completes operation.

Each dependency, as represented by a directed line within FIG. 6, can be annotated with one or more parameters characterizing the dependency. Within this specification, parameters characterizing a dependency are referred to "dependency parameters." Dependency parameters can be expressed as annotations on dependencies in a data flow graph or are otherwise associated with dependencies in a data flow graph. Examples of dependency parameters include, but are not limited to, latency and dependency type.

Referring to dependency types, a first dependency type is input-to-output within a hardware accelerator as exemplified by the dependency linking data transfer node 610 and/or 615 with data transfer 625. While latency is a separate parameter than dependency type, the latency of the first dependency type depends upon the way in which a given function is synthesized. For an input-to-output type of dependency that exists entirely within a hardware accelerator, the circuitry that implements the hardware accelerated function will, at least in part, determine latency as the hardware accelerator latency.

A second type of dependency is output of a hardware accelerator to an input of a different hardware accelerator. The latency of the second dependency type depends largely upon whether the data transfer between the two hardware accelerators is software-related or is hardware-related.

When the second type of dependency is software-related, data moves from an output of a first hardware accelerator to processor memory. The processor executes one or more software instructions. The data is then moved from processor memory to a second and dependent hardware accelerator. As such, the latency depends upon the time required to perform data transfers into and out of the processor memory and the time required by the processor to execute one or more software instructions including the driver(s) needed for receiving and sending the data.

When the second type of dependency is hardware-related, the data moves directly from one hardware accelerator to another hardware accelerator. In the hardware-related case, the latency depends upon the hardware interface between the two hardware accelerators, i.e., the generated data transfer network.

Figure 7:
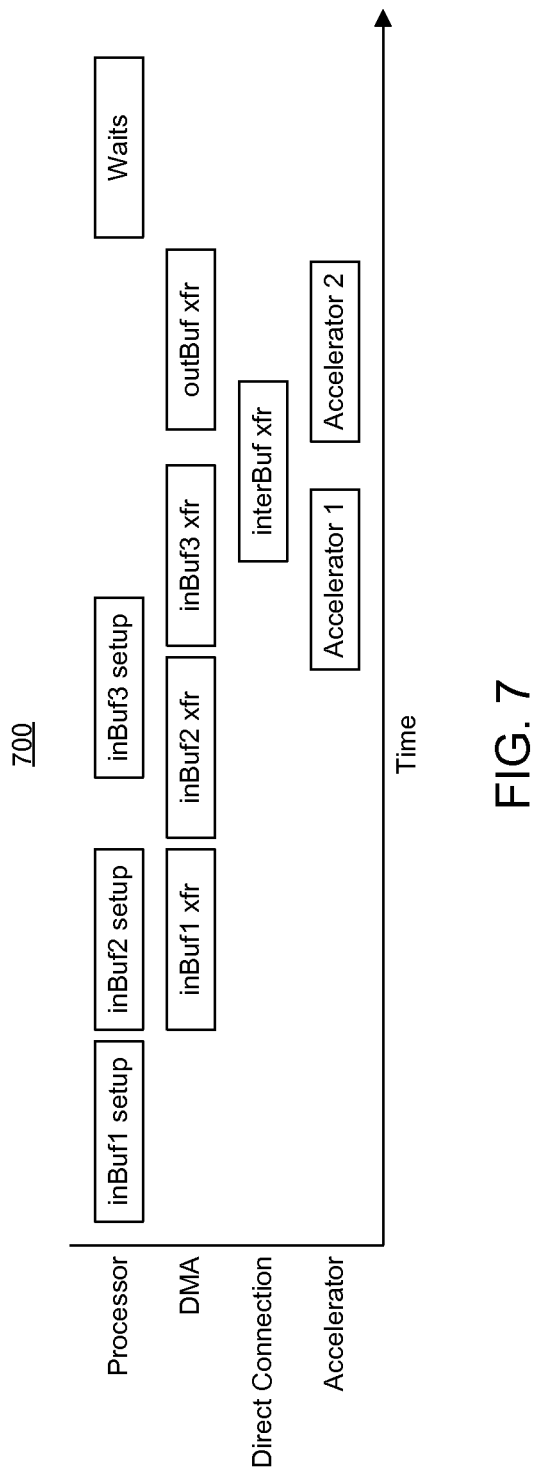
FIG. 7 illustrates an exemplary schedule for the design of FIG. 5.

FIG. 7 illustrates an exemplary schedule 700 for design 500 of FIG. 5. Scheduling 700 may be generated by RAS block 425 of FIG. 4. RAS block 425, for example, may generate scheduling 700 from schedule model 600.

In the example of FIG. 7, RAS block 425 has allocated setup time for the processor of the target IC for each of data transfers "inBuf1," "inBuf2," "inBuf3" representing execution of driver code to perform the data transfers "inBuf1," "inBuf2," and "inBuf3." The driver execution time is illustrated on the processor row of schedule 700 as "inBuf1 setup," "inBuf2 setup," and "inBuf3 setup."

As pictured, a DMA circuit block is the selected type of data mover. Further, a single DMA circuit block is used. As such, the data transfers for "inBuf1," "inBuf2," "inBuf3," and "outBuf" on the DMA row represented as "inBuf1 xfr," "inBuf2 xfr," and "inBuf3 xfr" take place serially and do not overlap. The data transfer "interBuf" is performed over a direct connection between the two hardware accelerators represented by blocks 605 and 630 of FIG. 6. As such, the data transfer "interBuf" may overlap in time with the data transfers performed using the DMA circuit block and driver execution time in the processor. Time for each of the hardware accelerators represented by blocks 605 and 630 of FIG. 6, pictured as "Accelerator 1" and "Accelerator 2," respectively, is scheduled.

Schedule 700 illustrates the amount of time that is required for the design to operate using the partitioning specified by the user at least with respect to the hardware accelerated partitions. The time allotted for Accelerator 1 and Accelerator 2, for example, is the latency determined from estimation block 420. The time required for execution of the drivers, e.g., the various "setup" blocks for the processor, and time for operation of the selected data mover circuit block is obtained from data mover database 430 as described.

Schedule 700 further illustrates that while one or more aspects of the design may operate in parallel, execution of the driver by the processor of the target IC is a serial operation. More particularly, despite two or more hardware accelerators being able to operation in parallel concurrently, the processor still executes each driver serially.

It should be appreciated that latency for the design, whether for hardware accelerated portions, for executable portions, or both taken as a whole may be determined from schedule model 600 and/or from schedule 700. As noted, schedule 700 is generated using schedule model 600. Using scheduling model 600 and/or schedule 700, those latencies of the design that overlap and those that do not for the specified partitioning are determined. Schedule 700, for example, specifies those latencies described herein that are incurred by the design serially and those that run in parallel or concurrently. As such, the overall latency of the hardware accelerated portions of the design, e.g., the hardware partition latency, may be determined from scheduling model 600 and/or from schedule 700. Software latency information, e.g., for partitions not hardware accelerated, also may be added or annotated to the processor node of scheduling model 600 of FIG. 6 and/or incorporated into schedule 700 on the processor transactions or operations in line with the various setup blocks shown.

Figure 8:
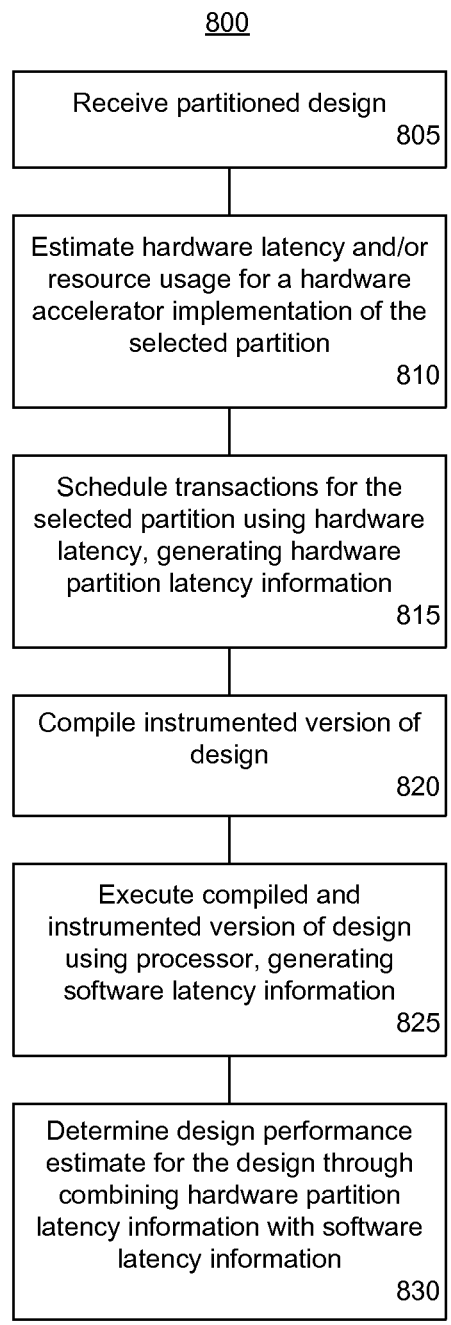
FIG. 8 is a flow chart illustrating an exemplary method of estimating the performance of a design partitioned for implementation using hardware and software within an IC.

FIG. 8 is a flow chart illustrating an exemplary method 800 of estimating the performance of a design partitioned for implementation using hardware and software within an IC. Method 800 is a high level description of the various operations implemented to estimate performance. Method 800 may be implemented by a system as described with reference to FIGS. 1 and 2 of this disclosure.

In block 805, the system receives a partitioned design. The design is specified in a high level programming language. The design includes one or more partitions selected for hardware acceleration within the target IC. The design further includes one or more partitions that will be processor executable partitions. The processor executable partitions are compiled and executed by a processor of the target IC.

In block 810, the system estimates hardware latency and/or resource usage for a hardware accelerator implementation of the selected partition. In block 815, the system schedules transactions for the selected partition using the hardware latency. Hardware latency may include hardware accelerator latency. Hardware latency may also include data mover circuit block latency. Hardware latency further may include driver latency. In one aspect, the system, through the scheduling, generates hardware partition latency.

In block 820, the system compiles an instrumented version of the design. In block 825, the system executes the instrumented and compiled version of the design using a processor. The system, through execution of the instrumented and compiled design generates software latency information. The software latency information indicates the amount of time necessary to execute partitions, using a processor, that are to be hardware accelerated and the amount of time necessary to execute partitions, using the processor, that are not hardware accelerated.

In block 830, the system determines a design performance estimate for the design. The design performance estimate is determined by combining the hardware partition latency information with the software latency information.

Figure 9:
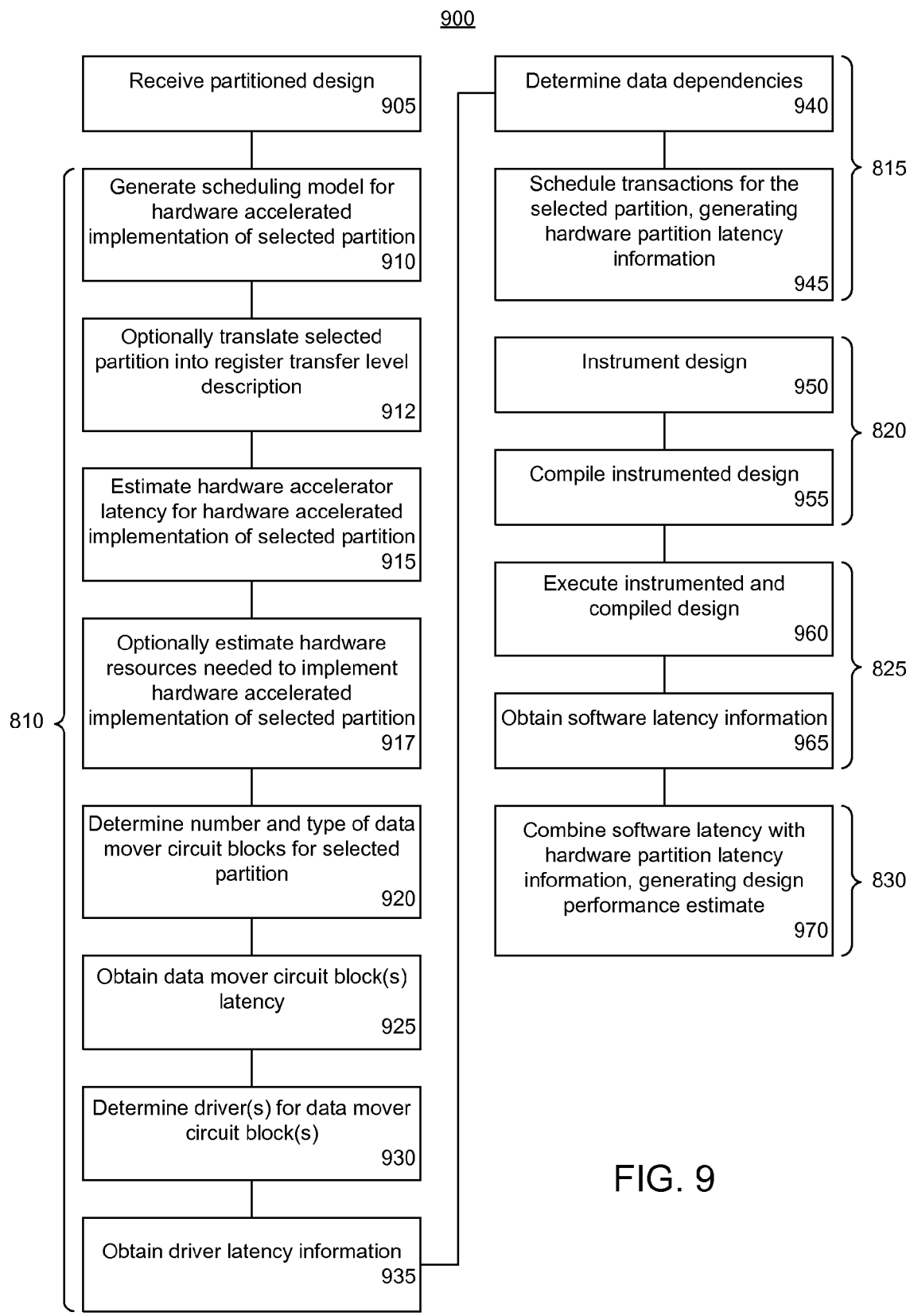
FIG. 9 is a flow chart illustrating an exemplary method of estimating performance of a design partitioned for implementation using hardware and software within an IC.

FIG. 9 is a flow chart illustrating an exemplary method 900 of estimating performance of a design partitioned for implementation using hardware and software within an IC. Method 900 presents a more detailed version of FIG. 8. Accordingly, method 900 also may be implemented by a system as described with reference to FIGS. 1 and 2. In block 905, the system receives a partitioned design.

Blocks 910-935 represent a more detailed implementation of block 810 of FIG. 8. In block 910, the system generates a scheduling model for the partition(s) designated for hardware acceleration. In block 912, the system optionally translates the selected partition, i.e., the partition(s) designated for hardware acceleration, into an RTL representation.

In block 915, the system estimates a hardware accelerator latency for the hardware accelerator implementation of the selected partition. The hardware accelerator latency specifies the amount of time needed for the hardware accelerator implementation of the selected partition to process a received input and generate an output. Hardware accelerator latency may be added, or annotated, to the scheduling model. In block 917, the system optionally estimates the hardware resources needed, e.g., hardware resource usage, from the target IC to implement the hardware accelerated implementation of the selected partition. The hardware resource usage also may be added, or annotated, to the scheduling model.

In one aspect, the hardware accelerator latency and/or resource usage may be estimated directly from the high level programming language of the design. In another aspect, the system estimates hardware accelerator latency and/or resource usage from the RTL description. The RTL description may be a cycle accurate description of the selected partition(s). The system may estimate the hardware accelerator latency using the RTL description. In another aspect, using known latency information for the various hardware resources that may be estimated for implementing the selected partition, the system further may calculate a refined estimate of the hardware accelerator latency or estimate hardware accelerator latency from hardware resources estimated to be required to implement the selected partition.

In block 920, the system determines the number and type of data movers needed for the selected partition. The number and type of data movers depends upon the amount of data and the type of data being moved into and out from each hardware accelerator. The amount of data and the type of data is ascertained from the arguments of the hardware accelerated function.

In block 925, the system obtains data mover circuit block latency information from the data mover database. The system further may determine the type and/or number of hardware resources needed to implement each data mover determined in block 920. The number and/or type of hardware resources for each data mover may be specified within the data mover database as part of the profiles stored therein. In block 930, the system determines, from the data mover database, the drivers needed for the data mover circuit blocks determined in block 920. In block 935, the system obtains, from the data mover database, driver latency information for the drivers determined in block 930. It should be appreciated that the system may add data mover circuit block latency, driver latency to the scheduling model, and hardware resources needed to implement the various data mover.

Blocks 940-945 represent a more detailed implementation of block 815 of FIG. 8. In block 940, the system determines data dependencies. In one aspect, the system determines data dependencies according to the scheduling model which includes the various latencies described. The scheduling model further indicates the particular number of data mover circuit blocks needed for the partition(s) that are to be hardware accelerated. In block 945, the system schedules transactions for the partition(s) selected for hardware acceleration. The system, using the various latencies described herein and the data dependencies to determine which operations may overlap and which may not, assigns the various operations to be performed to points in time as illustrated in FIG. 7. The resulting schedule specifies the timing for the hardware accelerator partitions that accounts for operation of the hardware accelerators themselves, driver execution time (e.g., setup), data transfers whether between processor and hardware accelerator or between hardware accelerators. It should be appreciated that the schedule, which specifies latency, will not necessarily be a summation of individual latencies as particular operations may overlap as previously described and illustrated in FIG. 7.

Blocks 950-955 represent a more detailed implementation of block 820. In block 950, the system instruments the design. Diagnostic program code is inserted into the design that stores the processor program counter value upon calling any hardware accelerated partition and upon return from any hardware accelerated partition. In block 955, the system compiles the instrumented design. It should be appreciated that the entire design, inclusive of partitions selected for hardware acceleration, is compiled.

Blocks 960-965 represent a more detailed implementation of block 825. In block 960, the system executes the instrumented and compiled design. For example, the instrumented and compiled design is loaded into the target IC and executed by the processor therein. Data generated from the instrumented program code may be output and/or read from the target IC by the system. In another aspect, the instrumented and compiled design may be executed within the system using a processor emulation application configured to emulate the processor of the target IC. In block 965, the system obtains software latency information. The software latency information includes the various processor program counter values that are obtained via execution of the design. The processor program counter values further are correlated with particular partitions, thereby indicating the amount of time required to execute partitions that are to be hardware accelerated and partitions that are not to be hardware accelerated.

In block 970, the system combines the software latency information with the hardware partition latency information. For example, the system may combine the amount of time required for partitions that are not to be hardware accelerated with the hardware partition latency information to generate the design performance estimate. As discussed, the hardware partition information includes the hardware accelerator latency, the data mover circuit block latency, and the driver latency, which is carried forward and included in the design performance estimate. The design performance estimate further may specify the improvement in latency achieved by hardware acceleration. The system, for example, may indicate the reduction in operation time for the hardware accelerated design compared to the fully executable version of the design. The improvement may be specified on a per-hardware accelerated partition basis.

Figure 10:
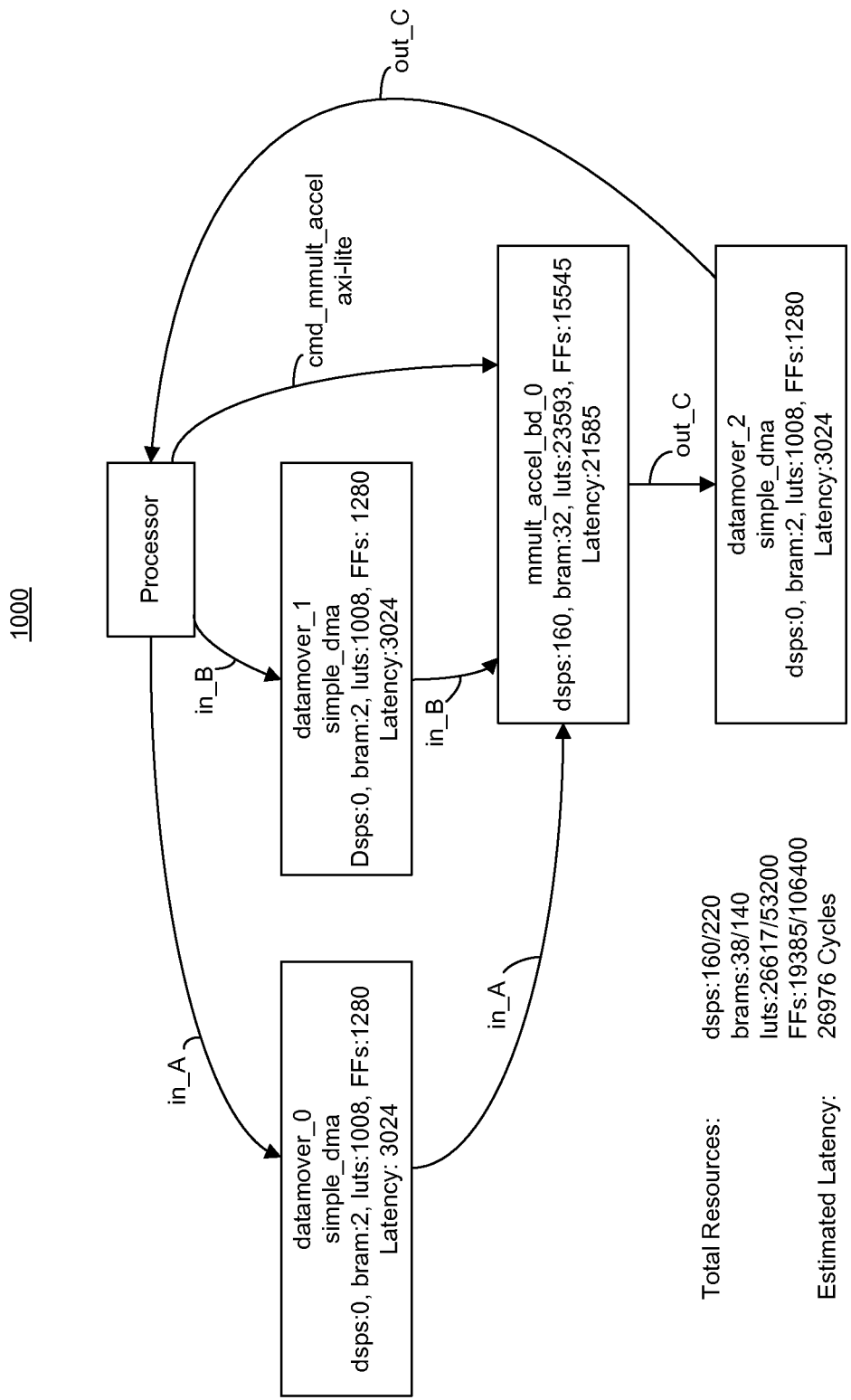
FIG. 10 is a block diagram illustrating an exemplary performance design estimate.

FIG. 10 is a block diagram illustrating an exemplary performance design estimate 1000 in accordance with another aspect. As pictured in FIG. 10, performance design estimate 1000 illustrates a visualization of the partitioned design showing estimates of the resources needed to implement the various hardware accelerated partitions. In the example of FIG. 10, the design includes one function called "mmult_accel_bd_0" that is to be hardware accelerated. The data movers needed are pictured as "datamover_0," "datamover_1," and "datamover_2." The data that is moved by each data mover, e.g., the arguments of each function, are shown flowing into and out from each data mover. Further, the commands that invoke each partition to be hardware accelerated are pictured. In this case, the command "cmd_mmult_accel" is provided to the hardware accelerated partition through an AXI-Lite communication interface between processor and hardware accelerator as opposed to being sent through either datamover_0 or datamover_1.

In one aspect, performance estimate 1000 further indicates an estimate of the number of different resources of the target IC that are required to implement each hardware accelerator and data mover. For example, the number of LUTs, DSPs, BRAMs, flip-flops (FFs), and the like are indicated for each hardware accelerated partition and for each data mover. The total number of such components required for implementing the hardware accelerator and data movers is also indicated out of the total number of such components available on the target IC as the "Total Resources." Further, the total latency is provided. In this example, the total latency of 27,976 cycles is the sum of the latency of datamover_0 (3,024 cycles), mmult_accel_bd_0 (21,585 cycles), and datamover_2 (3,024 cycles). Appreciably, datamover_0 and datamover_1 operate concurrently so that the latency of only one of the two data movers is used in calculating total latency. In the example of FIG. 10, driver execution latency is included within the latencies specified for each of datamover_0, datamover_1, and datamover_2.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined within this disclosure, the terms "a" and "an" mean one or more than one. The term "plurality," as defined herein, means two or more than two. The term "another," as defined herein, means at least a second or more. The term "coupled," as defined herein, means connected, whether directly without any intervening elements or indirectly with one or more intervening elements, unless otherwise indicated. Two elements may also be coupled mechanically, electrically, and/or communicatively linked through a communication channel, pathway, network, or system.

As defined herein, the term "automatically" means without user intervention. As defined herein, the term "user" means a human being. The term "and/or" as defined herein means any and all possible combinations of one or more of the associated listed items. The terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. Although the terms "first," "second," etc. may be used herein to describe various elements, these elements should not be limited by these terms, as these terms are only used to distinguish one element from another unless the context indicates otherwise.

As defined herein, the term "if" means "when," "upon," "in response to determining," "in response to detecting," "responsive to determining," or "responsive to detecting," depending on the context. Similarly, the phrase "if it is determined" or the phrase "if [a stated condition or event] is detected," as defined herein, means "upon determining," "in response to determining," "responsive to determining," "upon detecting [the stated condition or event]," "in response to detecting [the stated condition or event]," or "responsive to detecting [the stated condition or event]," depending on the context.

Within this disclosure, the same reference characters are used to refer to terminals, signal lines, wires, and their corresponding signals. In this regard, the terms "signal," "wire," "connection," "terminal," and "pin" may be used interchangeably, from time-to-time, within this disclosure. It also should be appreciated that the terms "signal," "wire," or the like may represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects described within this disclosure may be realized in hardware or a combination of hardware and software. One or more aspects may be realized in a centralized fashion in one system or in a distributed fashion where different elements are spread across several interconnected systems. Any kind of data processing system or other apparatus adapted for carrying out at least a portion of the methods described herein is suited.

One or more aspects further may be embedded in a computer program product, which includes all the features enabling the implementation of the methods described herein. The computer program product includes a computer-readable data storage medium. As defined herein, the phrase "computer-readable storage medium" means a storage medium that contains or stores program code for use by or in connection with an instruction execution system, apparatus, or device. As defined herein, a "computer-readable storage medium" is non-transitory and, as such, is not a transitory propagating signal per se. Examples of a computer-readable storage medium may include, but are not limited to, optical media, magnetic media, magneto-optical media, computer memory such as random access memory, a bulk storage device, e.g., hard disk, or the like.

The flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified function(s). It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one aspect, the blocks in the flow chart illustration may be performed in increasing numeric order corresponding to the numerals in the various blocks. In other aspects, the blocks may be performed in an order that is different, or that varies, from the numerals in the blocks. For example, two or more blocks shown in succession may be executed substantially concurrently. In other cases, two or more blocks may sometimes be executed in the reverse order, depending upon the functionality involved. In still other cases, one or more blocks may be performed in varying order with the results being stored and utilized in subsequent or other blocks that do not immediately follow.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code may include, but is not limited to, a subroutine, a function, a procedure, an object method, an object implementation, an executable application, an applet, a servlet, source code, object code, a shared library/dynamic load library and/or other sequence of instructions designed for execution on a computer system.

The corresponding structures, materials, acts, and equivalents of all means or step plus function elements in the claims below are intended to include any structure, material, or act for performing the function in combination with other claimed elements as specifically claimed.

A method includes, for a design specified in a high level programming language and having a processor executable partition and a partition selected for hardware acceleration, estimating hardware latency for a hardware accelerator implementation of the selected partition. The method includes scheduling the selected partition using the hardware latency, generating hardware partition latency information, compiling an instrumented version of the design using a processor, and executing the instrumented and compiled version of the design, generating software latency information. The method also includes determining a design performance estimate for the design through combining the hardware partition latency information with the software latency information.

Executing the instrumented and compiled version of the design may include instrumenting the design through inclusion of diagnostic program code. In one aspect, instrumenting the design includes including an instruction that determines a processor counter value responsive to calling the selected partition and including an instruction that determines the processor counter value responsive to returning from the selected partition.

Estimating hardware latency for a hardware accelerator implementation of the selected partition may include translating the selected partition into an RTL description of the selected partition and estimating a hardware accelerator latency according to the register transfer level description of the selected partition. The hardware latency includes the hardware accelerator latency. The RTL description of the selected partition may be cycle accurate.

Estimating hardware latency for a hardware accelerator implementation of the selected partition may also include estimating a hardware accelerator latency for the hardware accelerator implementation of the selected partition from the high level programming language. The hardware latency includes the hardware accelerator latency.

Estimating hardware latency for a hardware accelerator implementation of the selected partition further may include selecting a type of data mover circuit block for the selected partition from a plurality of different types of data mover circuit blocks and obtaining a data mover circuit block latency. The hardware latency includes the data mover circuit block latency.

Estimating hardware latency for a hardware accelerator implementation of the selected partition also may include selecting a driver for the data mover circuit block that is processor executable and obtaining driver latency information for the selected driver. The hardware latency includes the driver latency information.

Scheduling may include determining data dependency among data transfers and performing the scheduling according to the data dependency.

A system includes a processor, programmed to initiate executable operations. The executable operations include, for a design specified in a high level programming language and having a processor executable partition and a partition selected for hardware acceleration, estimating hardware latency for a hardware accelerator implementation of the selected partition. The executable operations also include scheduling the selected partition using the hardware latency, generating hardware partition latency information, compiling an instrumented version of the design, and executing the instrumented and compiled version of the design using a processor of a target integrated circuit generating software latency information. The executable operations further include determining a design performance estimate for the design through combining the hardware partition latency information with the software latency information.

Executing the instrumented and compiled version of the design includes instrumenting the design through inclusion of diagnostic program code. In one aspect, instrumenting the design may include including an instruction that determines a processor counter value responsive to calling the selected partition and including an instruction that determines the processor counter value responsive to returning from the selected partition.

Estimating hardware latency for a hardware accelerator implementation of the selected partition may include translating the selected partition into an RTL description of the selected partition and estimating a hardware accelerator latency according to the register transfer level description of the selected partition. The hardware latency includes the hardware accelerator latency. The RTL description of the selected partition may be cycle accurate.

Estimating hardware latency for a hardware accelerator implementation of the selected partition may also include estimating a hardware accelerator latency for the hardware accelerator implementation of the selected partition from the high level programming language. The hardware latency includes the hardware accelerator latency.

Estimating hardware latency for a hardware accelerator implementation of the selected partition may further include selecting a type of data mover circuit block for the selected partition from a plurality of different types of data mover circuit blocks and obtaining a data mover circuit block latency. The hardware latency includes the data mover circuit block latency.

Estimating hardware latency for a hardware accelerator implementation of the selected partition may also include selecting a driver for the data mover circuit block that is processor executable and obtaining driver latency information for the selected driver. The hardware latency includes the driver latency information.

Scheduling may include determining data dependency among data transfers and performing the scheduling according to the data dependency.

A non-transitory computer-readable storage medium has instructions stored thereon which, when executed by a processor, perform a method. The method includes, for a design specified in a high level programming language and having a processor executable partition and a partition selected for hardware acceleration, estimating hardware latency for a hardware accelerator implementation of the selected partition and scheduling the selected partition using the hardware latency generating hardware partition latency information. The method includes compiling an instrumented version of the design using the processor, executing the instrumented and compiled version of the design generating software latency information, and determining a design performance estimate for the design through combining the hardware partition latency information with the software latency information.

Executing the instrumented and compiled version of the design may include instrumenting the design through inclusion of diagnostic program code. The hardware latency may include a hardware accelerator latency, a data mover circuit block latency for a selected data mover circuit block for the hardware accelerator implementation of the selected partition, and a driver latency for the data mover circuit block.

The features described within this disclosure may be embodied in other forms without departing from the spirit or essential attributes thereof. Accordingly, reference should be made to the following claims, rather than to the foregoing disclosure, as indicating the scope of such features and implementations.

What is claimed is:

1. A method, comprising:
for a design specified in a high level programming language and comprising a processor executable partition and a partition selected for hardware acceleration, estimating hardware latency for a hardware accelerator implementation of the selected partition;
scheduling the selected partition using the hardware latency, generating hardware partition latency information;
compiling an instrumented version of the design using a processor;
executing the instrumented and compiled version of the design, generating software latency information; and
determining a design performance estimate for the design through combining the hardware partition latency information with the software latency information.

2. The method of claim 1, wherein executing the instrumented and compiled version of the design comprises:
instrumenting the design through inclusion of diagnostic program code.

3. The method of claim 2, wherein instrumenting the design comprises:
including an instruction that determines a processor counter value responsive to calling the selected partition; and
including an instruction that determines the processor counter value responsive to returning from the selected partition.

4. The method of claim 1, wherein estimating hardware latency for a hardware accelerator implementation of the selected partition comprises:
translating the selected partition into a register transfer level description of the selected partition;
estimating a hardware accelerator latency according to the register transfer level description of the selected partition;
wherein the hardware latency comprises the hardware accelerator latency.

5. The method of claim 4, wherein the register transfer level description of the selected partition is cycle accurate.

6. The method of claim 1, wherein estimating hardware latency for a hardware accelerator implementation of the selected partition comprises:
estimating a hardware accelerator latency for the hardware accelerator implementation of the selected partition from the high level programming language;
wherein the hardware latency comprises the hardware accelerator latency.

7. The method of claim 1, wherein estimating hardware latency for a hardware accelerator implementation of the selected partition comprises:
selecting a type of data mover circuit block for the selected partition from a plurality of different types of data mover circuit blocks; and
obtaining a data mover circuit block latency;
wherein the hardware latency comprises the data mover circuit block latency.

8. The method of claim 7, wherein estimating hardware latency for a hardware accelerator implementation of the selected partition further comprises:
selecting a driver for the data mover circuit block that is processor executable; and
obtaining driver latency information for the selected driver;
wherein the hardware latency comprises the driver latency information.

9. The method of claim 1, wherein scheduling comprises:
determining data dependency among data transfers; and
performing the scheduling according to the data dependency.

10. A system comprising:
a processor, programmed to initiate executable operations comprising:
for a design specified in a high level programming language and comprising a processor executable partition and a partition selected for hardware acceleration, estimating hardware latency for a hardware accelerator implementation of the selected partition;
scheduling the selected partition using the hardware latency, generating hardware partition latency information;
compiling an instrumented version of the design;
executing the instrumented and compiled version of the design using a processor of a target integrated circuit, generating software latency information; and
determining a design performance estimate for the design through combining the hardware partition latency information with the software latency information.

11. The system of claim 10, wherein executing the instrumented and compiled version of the design comprises:
instrumenting the design through inclusion of diagnostic program code.

12. The system of claim 11, wherein instrumenting the design comprises:
including an instruction that determines a processor counter value responsive to calling the selected partition; and
including an instruction that determines the processor counter value responsive to returning from the selected partition.

13. The system of claim 10, wherein estimating hardware latency for a hardware accelerator implementation of the selected partition comprises:
translating the selected partition into a register transfer level description of the selected partition; and
estimating a hardware accelerator latency according to the register transfer level description of the selected partition;
wherein the hardware latency comprises the hardware accelerator latency.

14. The method of claim 13, wherein the register transfer level description of the selected partition is cycle accurate.

15. The system of claim 10, wherein estimating hardware latency for a hardware accelerator implementation of the selected partition comprises:
estimating a hardware accelerator latency for the hardware accelerator implementation of the selected partition from the high level programming language;
wherein the hardware latency comprises the hardware accelerator latency.

16. The system of claim 10, wherein estimating hardware latency for a hardware accelerator implementation of the selected partition comprises:
selecting a type of data mover circuit block for the selected partition from a plurality of different types of data mover circuit blocks; and
obtaining a data mover circuit block latency;
wherein the hardware latency comprises the data mover circuit block latency.

17. The system of claim 16, wherein estimating hardware latency for a hardware accelerator implementation of the selected partition further comprises:
   selecting a driver for the data mover circuit block that is processor executable; and
   obtaining driver latency information for the selected driver;
   wherein the hardware latency comprises the driver latency information.

18. The system of claim 10, wherein scheduling comprises:
   determining data dependency among data transfers; and
   performing the scheduling according to the data dependency.

19. A non-transitory computer-readable storage medium having instructions stored thereon which, when executed by a processor, perform a method comprising:
   for a design specified in a high level programming language and comprising a processor executable partition and a partition selected for hardware acceleration, estimating hardware latency for a hardware accelerator implementation of the selected partition;
   scheduling the selected partition using the hardware latency, generating hardware partition latency information;
   compiling an instrumented version of the design using the processor;
   executing the instrumented and compiled version of the design, generating software latency information; and
   determining a design performance estimate for the design through combining the hardware partition latency information with the software latency information.

20. The non-transitory computer-readable storage medium of claim 19, wherein:
   executing the instrumented and compiled version of the design comprises instrumenting the design through inclusion of diagnostic program code; and
   the hardware latency comprises a hardware accelerator latency, a data mover circuit block latency for a selected data mover circuit block for the hardware accelerator implementation of the selected partition, and a driver latency for the data mover circuit block.

\* \* \* \* \*